B. C. CALDERWOOD.
JOURNAL BEARING MECHANISM FOR PICKING FINGERS IN COTTON PICKING MACHINES.
APPLICATION FILED APR. 30, 1913. RENEWED FEB. 1, 1919.
1,313,255. Patented Aug. 19, 1919.
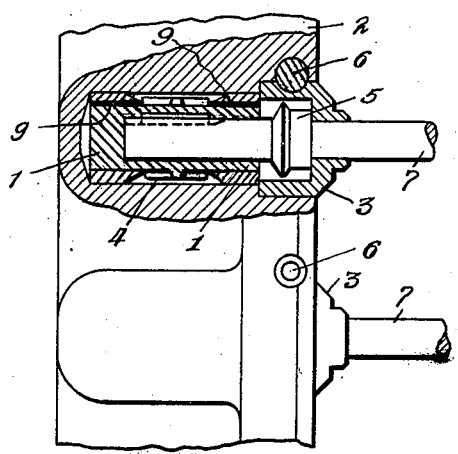
Fig. 4
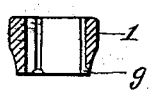
Fig. 1
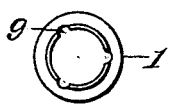
Fig. 2
Fig. 3
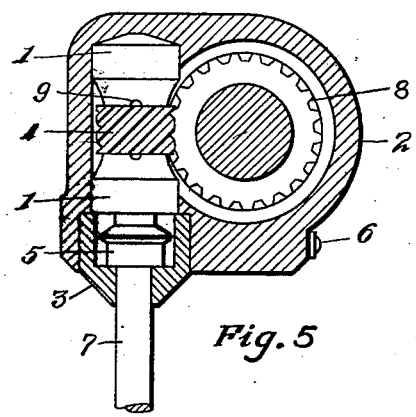
Fig. 5

UNITED STATES PATENT OFFICE.

BENJAMIN CRABTREE CALDERWOOD, OF VALLEY FALLS, RHODE ISLAND, ASSIGNOR TO PRICE-CAMPBELL COTTON PICKER CORPORATION, OF NEW YORK, N. Y., A CORPORATION OF DELAWARE.

JOURNAL-BEARING MECHANISM FOR PICKING-FINGERS IN COTTON-PICKING MACHINES.

1,313,255.        Specification of Letters Patent.        Patented Aug. 19, 1919.

Application filed April 30, 1913, Serial No. 764,521. Renewed February 1, 1919. Serial No. 274,565.

*To all whom it may concern:*

Be it known that I, BENJAMIN CRABTREE CALDERWOOD, a citizen of the United States, residing at Valley Falls, in the county of Providence and State of Rhode Island, have invented certain new and useful Improvements in Journal-Bearing Mechanisms for Picking-Fingers in Cotton-Picking Machines, of which the following is a specification.

My invention relates to improvements in a bearing mechanism for picking fingers in cotton-picking machines whereby a combined finger socket and spiral pinion engages with and is rotated by a spiral gear shaft, said combined finger socket and spiral pinion rotating in a series of two journals placed in line with one another, and themselves free to rotate in their respective bearings.

The objects of my invention are: first, to provide means for preventing the combined spiral pinion and finger socket from becoming stuck, either from overheating, lack of lubricant or other causes; and second, to facilitate replacement should a bearing become worn or damaged.

I accomplish these objects by the means illustrated in the accompanying drawings, in which—

Figure 1 is a side view of a bronze journal bearing.

Fig. 2 is a section through the center line, and

Fig. 3 is a front view.

Fig. 4 is a side view of a portion of a carrier, partly cut away at the center line of the picking fingers to show relation of the two bronze journal bearings to the combined finger socket and spiral pinion. This view also illustrates the manner in which the bearings are all held in position by the finger locking ring, shown by 3.

Fig. 5 is a top view with the carrier in section at the center line of the picking fingers. This view illustrates the manner in which the combined finger socket and spiral pinion is rotated by the spiral shaft inclosed in the carrier, also the manner in which the journal bearings are lubricated by the oil from the spiral pinion entering the small channels shown at either end of spiral pinion.

Referring to the drawings, 1 are the journal bearings, 2 the carrier, 3 the finger locking rings, 4 the combined spiral pinion and finger socket, and 5 the oil throw ring on the picking finger. 6 is the sliding spring pin for holding the locking ring 3 in place, 7 a picking finger shown in portion, 8 the spiral driving shaft, and 9 the channels by which the oil enters the journal bearings from the combined spiral pinion and finger socket.

The combined spiral pinion or gear and finger socket 4 is splined or keyed at $x$ to the butt end of the picking-finger or spindle 7 so that this pinion and the spindle work together, the spindle butt rotating in the journal bearings 1.

What I claim is,—

1. The combination in journal bearing mechanism for picking fingers in cotton picking machines, comprising journal bearings; a combined finger socket and spiral pinion, rotating in said journal bearings; a picker finger keyed in said combined finger socket and spiral pinion; and a driving gear for the spiral pinion.

2. The combination in journal bearing mechanism for picking fingers in cotton picking machines, comprising a pair of journal bearings; a combined finger socket and spiral pinion rotating in said journal bearings, with the pinion between the same; a picker finger keyed in said combined finger socket and spiral pinion; and a driving gear for the spiral pinion.

3. The combination in journal bearing mechanism for picking fingers in cotton picking machines, comprising a casing; a pair of journal bearings supported thereby; a combined finger socket and spiral pinion, rotating in said journal bearings, with the pinion between the same; a picker finger keyed in said combined finger socket and spiral pinion; and a driving gear for the spiral pinion.

In testimony whereof I have hereunto set my hand in the presence of two subscribing witnesses, this 25th day of April, 1913.

BENJAMIN CRABTREE CALDERWOOD.

Witnesses:
G. BLAKE,
WILLIAM J. DODGE.